Patented Aug. 5, 1930

1,772,131

UNITED STATES PATENT OFFICE

JOSEPH G. DAVIDSON, OF YONKERS, NEW YORK, AND ERNEST W. REID, OF PITTSBURGH, PENNSYLVANIA, ASSIGNORS TO CARBIDE & CARBON CHEMICALS CORPORATION, A CORPORATION OF NEW YORK

PLASTIC-CASEIN COMPOSITION

No Drawing.   Application filed January 3, 1928. Serial No. 244,369.

Our invention relates to casein plastics, and particularly to plasticizing methods adapted to the maintenance of a moderate degree of plasticity of the casein for a substantial period of time.

In the manufacture of moulded objects from casein, the process consists in the operations of separating the casein from milk by a sequence of steps, well known in the art, and an appropriate purification by processes which are also well known. The raw casein material from these steps is available in the form of a granular white powder. By the use of various plasticizing means, this material has been formed, either with or without coloring materials into various useful objects, by a plastic moulding operation. Difficulty has however been encountered in the moulding because of the lack of fully satisfactory plasticizing agents. Water alone has been used to plasticize the casein, and it produces a sufficient degree of plasticity, but it dries out with an undue speed, and in the drawing there is a tendency for the moulded article to crack and check. Various of the alkalies have also been used, in combination with water, but they likewise are unsatisfactory because of the fact that they introduce various impurities into the casein.

Our invention provides a new and useful plasticizer for casein, which when mixed with the casein produces a very satisfactory degree of plasticity, which is retained for a desirable length of time, and which avoids the difficulties from cracking and checking previously encountered. My invention consists in the preparation of a plastic casein mixture containing an organic base as the plasticizing agent, such as triethanol-amine $$(CH_2.CH_2OH)_3N,$$

or mixtures consisting of tri-ethanol-amine, other ethanol amines and ethylene di-amines. The suitable substances are organic bases, such as amines, or substituted ammonias or amido compounds, diamines, etc.

Other objects and details of our invention will be apparent from the following description.

In preparing a casein plastic according to our invention, we may take a suitable amount of the dry pulverized casein, and mix with it a suitable proportion of water, and a suitable proportion of the organic base, such as the tri-ethanol-amine, either with or without the other ethanol amines and with or without ethylene di-amine. The water may conveniently be present to the extent of about 5% of the amount of the casein, and may be varied over a substantial range, either above or below this proportion, according to the degree of plasticity desired for moulding. The ethanol-amines, either singly or in the mixture may likewise be included in the proportion of about 5%, which proportion is also subject to variation according to the amount of plasticity desired. The various substances may then be incorporated together in any convenient way, as by kneading in an appropriate kneading machine or by other stirring or working devices, until a homogeneous mixture is obtained. The mixture may then be moulded in the usual way. After removal of the moulded objects from the molds they may be set aside to dry by evaporation of the contained water. This evaporation occurs at a good rate of speed but even when the object has lost practically all of the included moisture, it does not lose its plasticity entirely because of the presence of the non-volatile ethanol-amines. Accordingly, the moulded object shows no tendency to crack or check, and it retains a substantial amount of plasticity throughout its life instead of assuming the extremely hard, brittle condition characteristic of casein objects as previously moulded.

We find that the ethanol amines likewise show a substantial amount of hygroscopicity. Accordingly the casein object does not dry down to the degree of dryness which occurs in the absence of such substances as the ethanol amines previously disclosed.

Alternatively the water of the previously described embodiment may be omitted. For this embodiment, the dry casein, and the appropriate ethanol amines may be mixed, and kneaded together for a suitable length of time by any convenient means, until a homogeneous mixture is obtained. This mixture is less plastic, with the same portion of amines, than the mixture containing water, but an adequate amount of plasticity is obtainable by the use of increased quantities of the amines. The mixture may then be moulded in the usual way, by the application of suitable pressure as in a mould or otherwise. The amount of plasticity obtained by this embodiment is less, but substantially constant, over a considerable period of time, as compared to the previously described embodiment.

By our invention as above disclosed we have thus produced a new and useful type of casein mixture having a much more satisfactory degree of plasticity, which is retained to much better advantage and over a much longer time than the plasticity produced by previously used plasticizing agents. We have likewise produced a casein mixture containing a new and useful substance, that is containing one or more of the ethanol-amines or a similar substance.

While we have disclosed a limited number of embodiments of our invention it is capable of still other modifications therefrom without departing from the spirit thereof and we desire, therefore that only such limitations shall be imposed thereon as are indicated in the appended claims or required by the prior art.

We claim as our invention:

1. A plastic casein composition comprising casein and an ethanol-amine.

2. A plastic casein composition comprising casein and a plurality of ethanol-amines.

3. A plastic casein composition comprising casein, moisture, and a mixture of tri-ethanol amine and di-ethanol amine.

4. A plastic casein composition comprising casein, moisture, and ethylene di-amine and tri-ethanol amine.

In testimony whereof, we affix our signatures.

JOSEPH G. DAVIDSON.
ERNEST W. REID.